United States Patent [19]

Atkins

[11] Patent Number: 5,799,319
[45] Date of Patent: Aug. 25, 1998

[54] METHOD FOR NAMING COMPUTER FILES

[76] Inventor: Hank Atkins, 90 Waterside La., W. Hartford, Conn. 06107

[21] Appl. No.: 501,778

[22] Filed: Jul. 13, 1995

[51] Int. Cl.$^6$ .................................................... G06F 17/30
[52] U.S. Cl. ............................................................ 707/200
[58] Field of Search .................................. 395/601, 604, 395/610, 616, 200.12, 346, 588, 769, 800, 806, 652, 760

[56] References Cited

U.S. PATENT DOCUMENTS

| 5,303,361 | 4/1994 | Colwell et al. | 395/604 |
| 5,423,034 | 6/1995 | Cohen-Levy et al. | 395/610 |
| 5,452,416 | 9/1995 | Hilton et al. | 395/346 |
| 5,452,425 | 9/1995 | Childers et al. | 395/588 |
| 5,495,603 | 2/1996 | Fruchtman et al. | 395/616 |
| 5,623,690 | 4/1997 | Palmer et al. | 395/806 |

Primary Examiner—Thomas G. Black
Assistant Examiner—Ruay Lian Ho
Attorney, Agent, or Firm—Fishman, Dionne, Cantor & Colburn

[57] ABSTRACT

A computer program generates an information screen display at a terminal of a computer. The information requested includes a prompt for a submission number. A set is created under the submission number. This set is intended to hold a plurality of image data files. This information is entered by a user prior to saving any images. Images are acquired and corresponding video outputs are presented to a computer, where the video images are digitized to generate image data sets. Desired images are saved by selecting a save feature. The save feature saves the image data in memory of the computer. The image data is saved as an image file, which is assigned a file name corresponding to the submission number followed by a suffix. For each subsequent image file saved, the suffix is automatically updated.

20 Claims, 3 Drawing Sheets

FIG. 1

METHOD FOR NAMING COMPUTER FILES

BACKGROUND OF THE INVENTION

The present invention relates generally to computer files. More specifically, the present invention relates to method of automatically naming a plurality of computer files of a set.

Digitizing video signals of acquired images to generate image data is well known. For each image data to be saved as an image file in memory of a computer, a file name must be defined and entered by the user. These files are typically held in a directory created by the user or a pre-existing directory. The saved images are commonly sent to another computer system at a remote location and stored in that computer's memory. These images can be reproduced by and/or displayed on the remote computer's screen. However, these images must first be retrieved from memory, whereby an image file is opened by entering or selecting the corresponding image file name that was previously assigned. Assigning and keeping track of all of the image file names can be cumbersome.

SUMMARY OF THE INVENTION

The above-discussed and other drawbacks and deficiencies of the prior art are overcome or alleviated by the method of naming computer files of the present invention. In accordance with the present invention, a computer program generates an information screen display at a terminal of a computer. The information requested includes a prompt for a submission number. A set is created under the submission number. This set is intended to hold a plurality of image data files. This information is entered by a user prior to saving any images.

Images are acquired and the resulting video outputs indicative of the acquired images are presented to a computer, where the video images are digitized to generate image data sets. Desired images are saved by selecting a save feature. The save feature saves the image data set in memory of the computer. The image data is saved as an image file, which is assigned a file name corresponding to the submission number followed by a suffix. For each subsequent image file saved the suffix is automatically updated. A series of related images are saved as described above.

The saved images are sent to another computer system at a remote location. The received images are stored in the remote computer's memory when received. These images can be reproduced by, for example, an external color video copy processor, and/or displayed on that computer's screen.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGS.:

FIG. 1 is a view of a computer screen display for use in the method of naming computer files of the present invention;

DESCRIPTION OF THE PREFERRED EMBODIMENT

Figure 1:
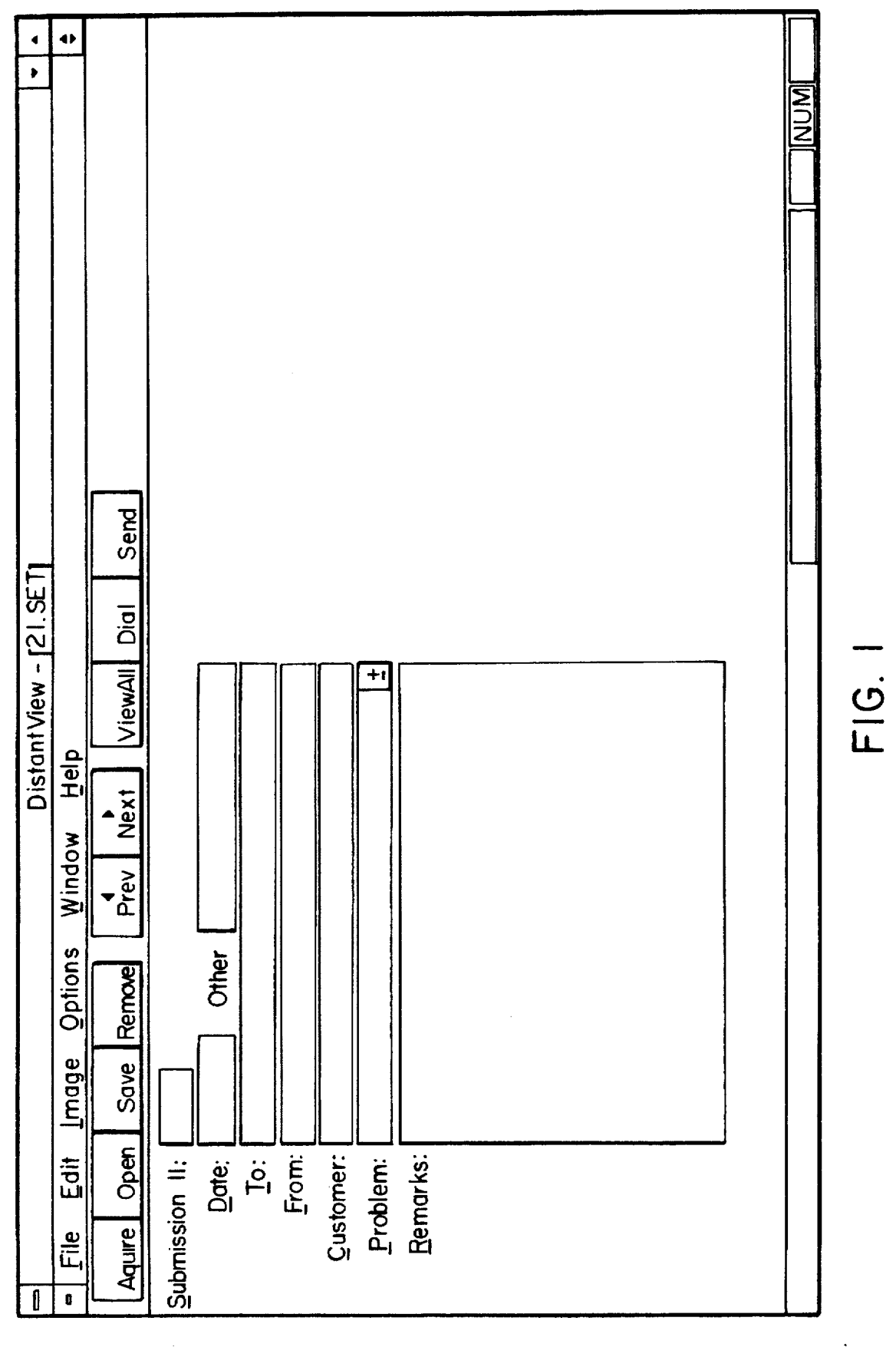

In accordance with a preferred embodiment of the present invention, a computer program generates an information screen display (i.e., a submittal screen display), FIG. 1, at a terminal of a computer, operating in a Windows™ based format. The information requested includes prompts for such entries as date, to, from, customer or other suitable information. Most importantly, a prompt for a submission number (comprising a string of characters) is provided. A set is created under the submission number. This set is intended to hold a plurality of image data files. This information is entered by a user prior to saving any images.

Figure 2:
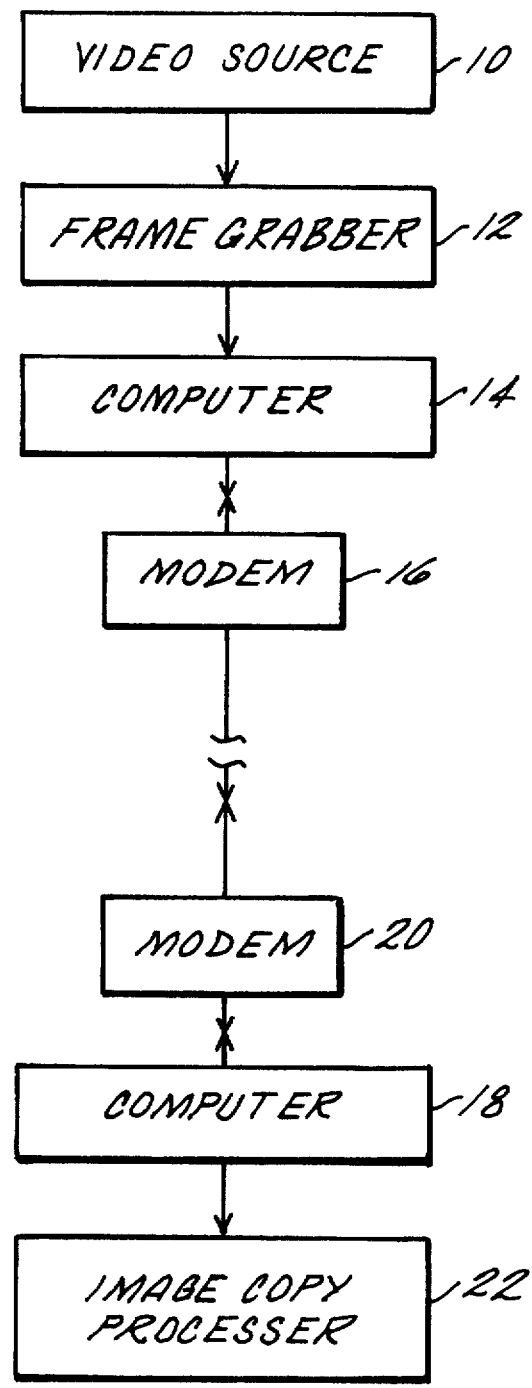
FIG. 2 is a block diagram of a system for use in the method of naming computer files of the present invention.

Referring to FIG. 2, images are acquired through, for example, a camcorder or other suitable video source 10 having a video output. This video output is presented to a frame grabber 12 (e.g., ComputerEyes 2.0™), preferably a card installed in an appropriate slot in a computer 14. The frame grabber card digitizes the video images (i.e., creates image data sets) and presents them to the computer for display on the computer screen, as is well known. The images are displayed on the computer screen when the acquire feature is selected (e.g., selecting an appropriate button on the computer screen). An image is captured by selecting an image grab feature (again, by selecting an appropriate button). An image is frozen by selecting a is not saved to a disk, rather the frame grabber is simply halted at the image chosen, as is well known. This frozen image may be saved or unfrozen and another image obtained. A frozen image is saved by selecting the save feature, which saves the image as a JPEG file, i.e., a Windows™ compression format for images. The save feature saves the image data set in memory of the computer. The image data is saved as an image file, which is assigned a file name corresponding to the submission number followed by a suffix (of at least one character). For each subsequent image file saved, the suffix is automatically updated, i.e., incremented. For example, with a submission number 12345, the first image saved would have a file name of 12345-01, the second image save would have a file name of 12345-02 and so on. A series of related images are saved as described above.

The series of saved images can be viewed individually using previous and next features to scroll through the images (i.e., image files). These images can also be viewed collectively, in a so-called "thumbnail" view, on a single screen by selecting this feature, and an individual image can be selected using a computer screen arrow to point to the image and a computer mouse to initiate the selection, this type of computer operation being well known in the art. The saved images are sent over a modem 16 associated with the computer through, for example, an E-mail type system (e.g., MS Mail™, Lotus cc:Mail™), or other suitable systems, to another computer system 18, via its modem 20, at a remote location. A dial feature is selected to establish communications between the sending and receiving computers, thereafter a send feature is selected to transmit the images. The received images are stored in the remote computer's memory when received. These images can be reproduce by, for example, an external color video copy processor 22, and/or displayed on that computer's screen. The images can be accessed using the previous, next and view all features described hereinbefore.

An image data set (or an image file) can be modified using a draw or text feature. The draw feature, when selected, allows the user to draw on an image using a mouse or pen, whereby areas of interest on the image can be noted or modifications suggested. The text feature, when selected, allows the user to type in text on the image, for identification, instructions, notes or other purposes. A grid feature is also provided, and when selected, displays a grid over the image to aid in locating an object or area in the image. The two-dimensional grid is formed in the present example by a series of equally spaced x-direction and y-direction lines which are typically labeled with coordinates (e.g., A–G along one axis and 1–10 along the other axis).

Images stored at either the local or remote computer can be opened by using the open feature and designating a particular submission number. When the open feature is selected, a list of stored submissions may be displayed, listing the submission number, to, from, date and customer. A particular set is selected, e.g., by double clicking the screen pointer with the mouse on the set to be opened. In the preferred embodiment, the list of stored submissions is the screen displayed when the computer program of the present invention is accessed, whereby a new feature is provided for obtaining new images as described above.

Figure 3:
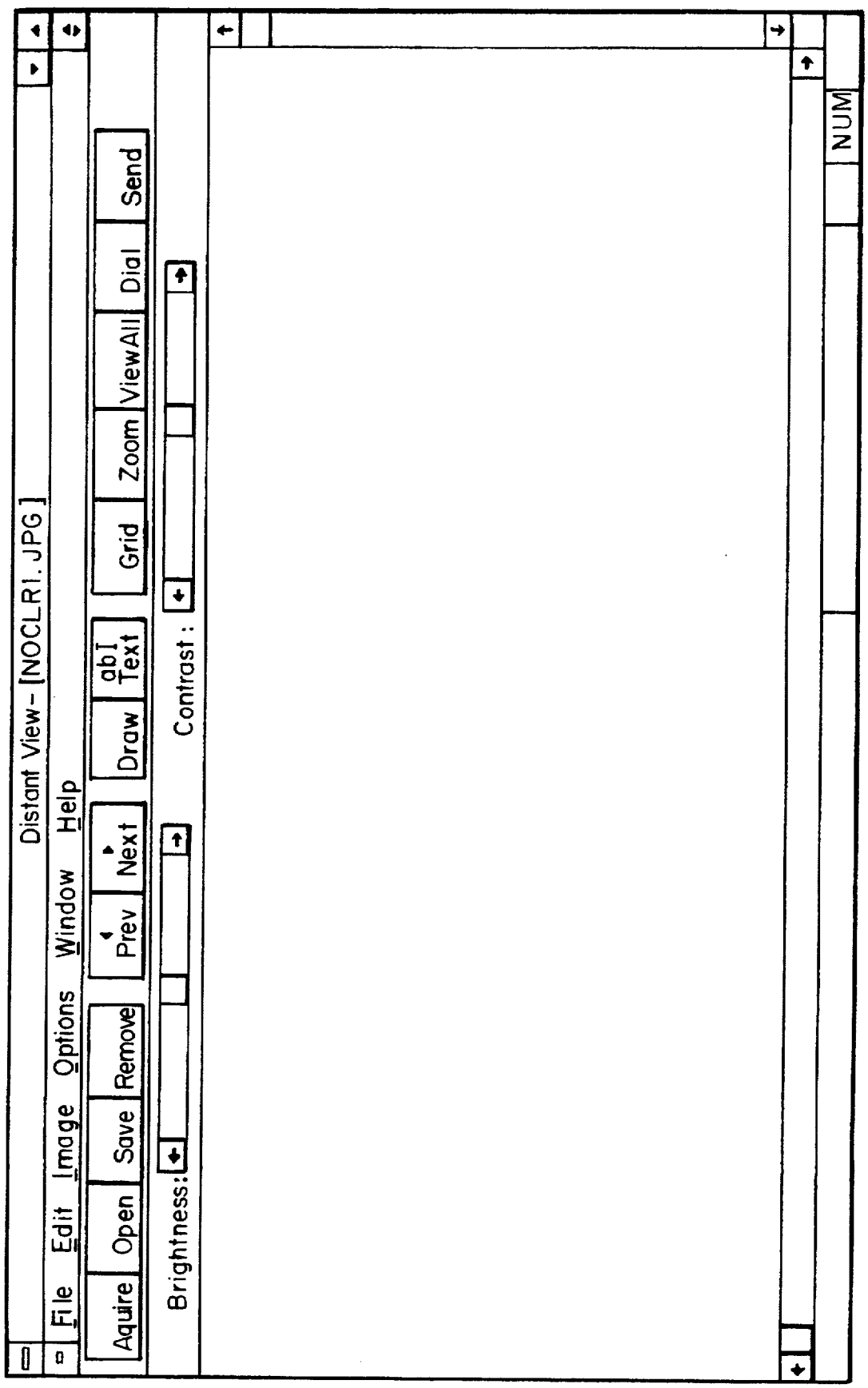
FIG. 3 is a view of another computer screen display for use in the method of naming computer files of the present invention.

It will be appreciated, that in the preferred embodiment the above described system operates in a Windows™ format and the features described are selected by clicking the screen pointer with the mouse on a corresponding button or menu bar, FIG. 3, as is well known in the art.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for naming files to be stored in memory of a computer, comprising:
   establishing a set in the computer, said set being designated by an identifier comprising a series of characters;
   generating a plurality of data to be saved as files in the memory of the computer; and
   automatically assigning each of said files a file name when saved, said file name being made up of said identifier with at least one character appended thereto which is modified for each sequential said file,
   wherein said at least one character appended to said identifier is modified for each sequential said file by incrementing said at least one character for each sequential said file.

2. The method of claim 1 wherein said step of generating said plurality of said data to be saved comprises generating a plurality of image data to be saved.

3. The method of claim 2 wherein said step of generating said plurality of image data sets comprises:
   (1) acquiring a video image;
   (2) digitizing said video image to generate said image data set; and
   (3) repeating steps (1) and (2) for each of said image data set to be generated.

4. The method of claim 2 wherein said files are JPEG files.

5. The method of claim 2 further comprising the steps of:
   sending said files from the computer to another computer; and
   receiving said files at said other computer.

6. The method of claim 5 further comprising the step of:
   generating a physical image from one of said files received.

7. The method of claim 2 further comprising the step of:
   drawing external information onto one of said image data, whereby said external information is incorporated with said image data when saved as said file.

8. The method of claim 2 further comprising the step of:
   entering external text onto one of said image data, whereby said external text is incorporated with said image data when saved as said file.

9. The method of claim 2 further comprising the step of:
   overlaying a grid onto one of said image data.

10. The method of claim 1 wherein said at least one character appended to said identifier is appended at the end of said identifier.

11. The method of claim 1 wherein said at least one character is a number.

12. An apparatus for naming files, comprising:
   a video source for providing video image signals;
   a data generator for generating a plurality of image data from said video image signals; and
   computer processor for establishing a set, said set being designated by an identifier comprising a series of characters, said computer processor receptive to image data and having memory for saving said image data as image files, said memory for storing signals including program signals defining a program for automatically assigning each of said files a file name when saved, said file name being made up of said identifier with at least one character appended thereto which is modified for each sequential said file,
   wherein said at least one character appended to said identifier is modified for each sequential said image file by incrementing said at least one character for each sequential said file.

13. The apparatus of claim 12 wherein said data generator for generating said plurality of image data comprises:
   a digitizer which digitizes said video image signals to generate said image data.

14. The apparatus of claim 12 wherein said at least one character appended to said identifier is appended at the end of said identifier.

15. The apparatus of claim 12 further comprising:
   a transmitter for sending said image files from said computer processor to another computer processor; and
   a receiver for receiving said files at said other computer processor.

16. The apparatus of claim 15 further comprising:
   a display device for generating a physical image from one of said image files received.

17. The apparatus of claim 12 further comprising:
   an input device for drawing external information onto one of said image data, whereby said external information is incorporated with said image data when saved as said image file.

18. The apparatus of claim 12 further comprising:
   an input device for entering external text onto one of said image data, whereby said external text is incorporated with said image data when saved as said image file.

19. The apparatus of claim 12 further comprising:
   an overlay device for overlaying a grid onto one of said image data.

20. The apparatus of claim 12 wherein said at least one character is a number.

* * * * *